Oct. 22, 1929.  J. A. SHIVELY  1,732,776
MACHINE FOR GUM STRIPPING TIPS OF BEADS
Filed Nov. 14, 1927  5 Sheets-Sheet 1

Inventor
Jess A. Shively
Attorney

Oct. 22, 1929.                J. A. SHIVELY                1,732,776
                MACHINE FOR GUM STRIPPING TIPS OF BEADS
                    Filed Nov. 14, 1927        5 Sheets-Sheet 3

Inventor
Jess A. Shively.

Attorney

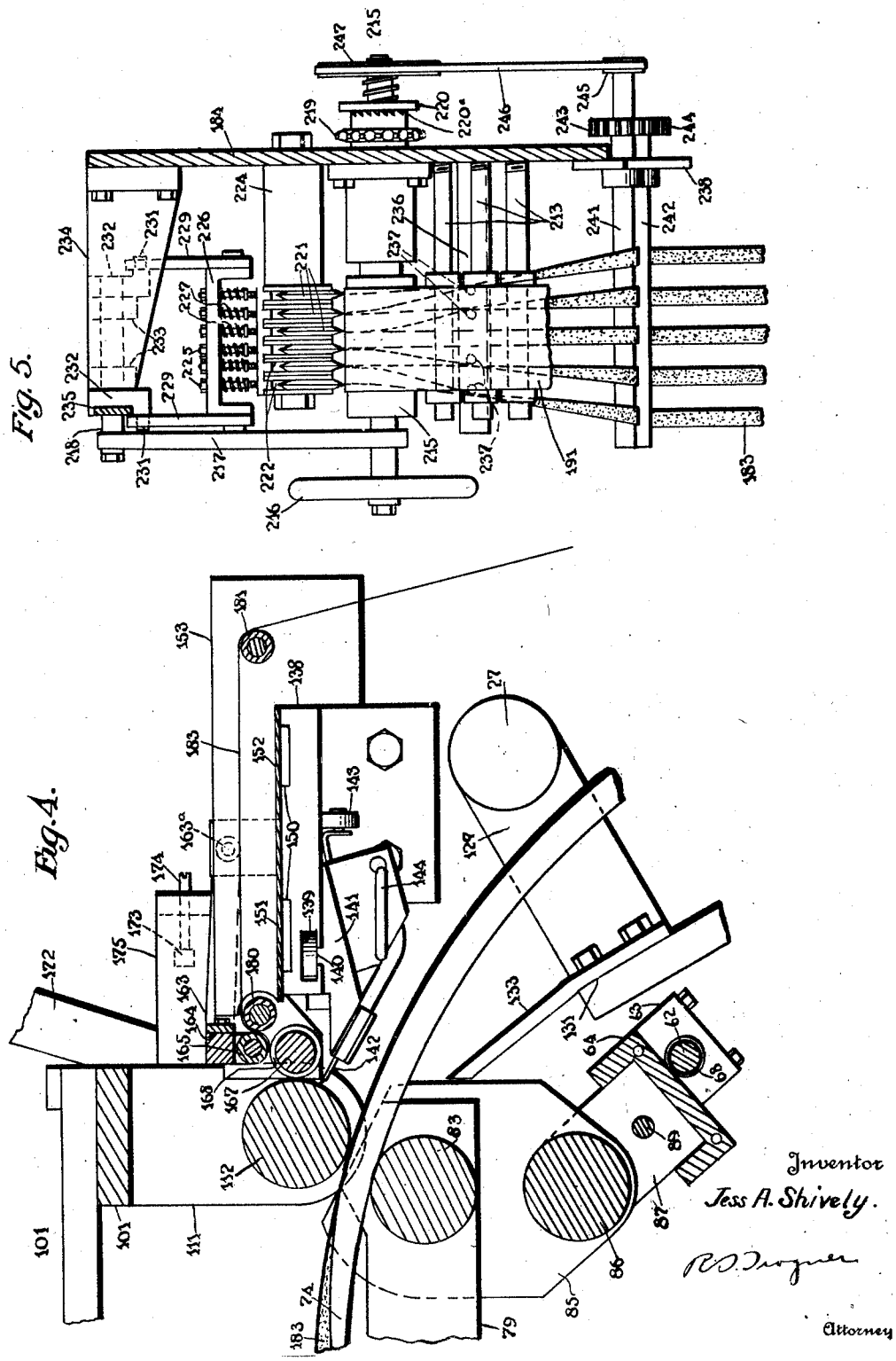

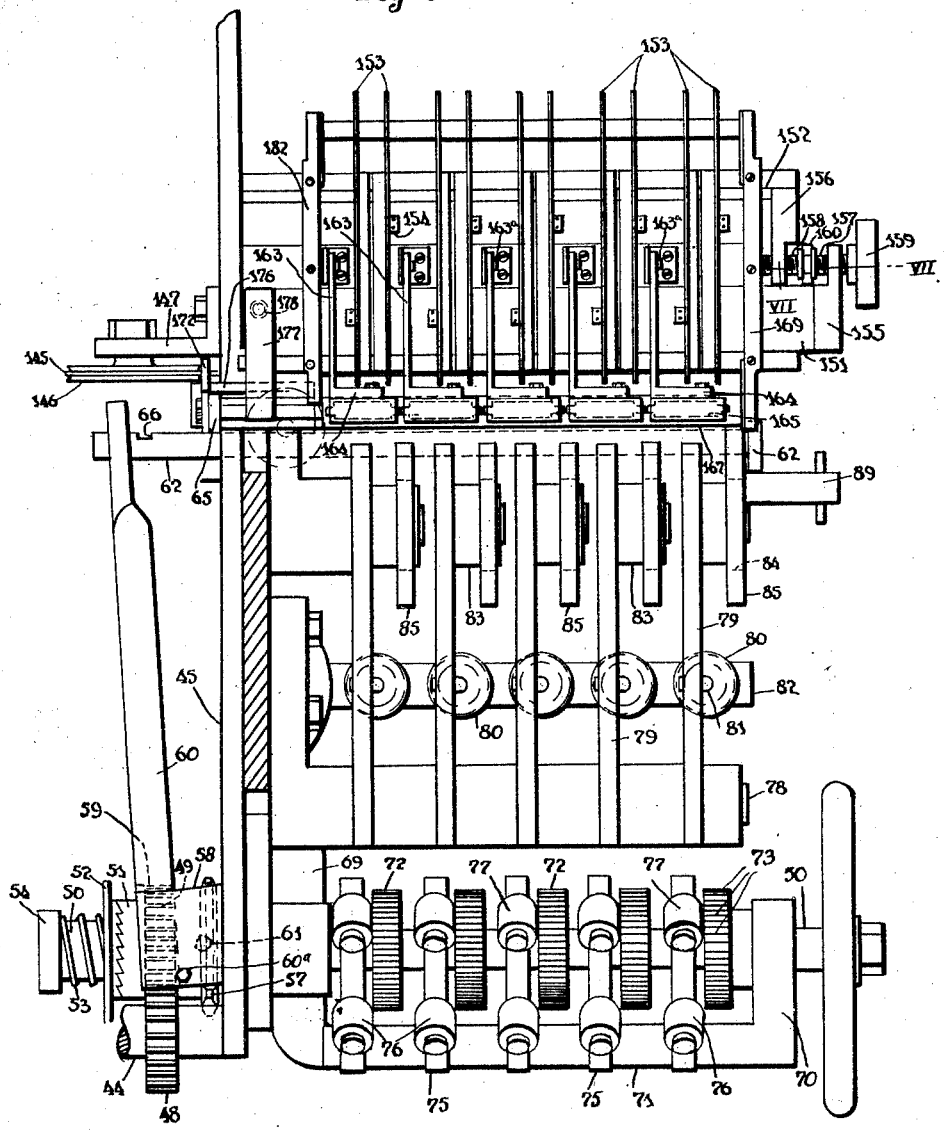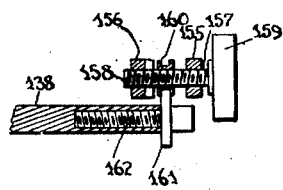

Patented Oct. 22, 1929

1,732,776

UNITED STATES PATENT OFFICE

JESS A. SHIVELY, OF AKRON, OHIO, ASSIGNOR TO THE GOODYEAR TIRE & RUBBER COMPANY, OF AKRON, OHIO, A CORPORATION OF OHIO

MACHINE FOR GUM-STRIPPING TIPS OF BEADS

Application filed November 14, 1927. Serial No. 232,977.

My invention relates to bead building machines and it has particular relation to mechanism for applying gum strips to the tips of tire beads prior to the application of flipper strips thereto.

One object of my invention is to provide mechanism adapted to apply simultaneously gum strips to a plurality of tire beads.

Another object of my invention is to provide a feeding mechanism adapted to supply continuous strips of gum to a device for applying the strips directly to the beads.

A further object of my invention is to provide a mechanism that is adapted to split a wide band of gum into a plurality of narrow strips and to feed the strips to a stitching mechanism.

It is the usual practice in the manufacture of tire beads to apply a strip of gum, such as uncured or partially cured rubber compound, to the tips thereof prior to the application of the flipper strip. Heretofore, this operation has been entirely manual, a bead being placed upon a rotating cone-like member and the gum strip stitched to the tip of the bead by means of a manually operated roller. Gum strips were supplied to the workmen in strips of convenient length and width for application to a bead, and these strips were usually preserved between sheets of fabric liner material. This operation obviously was slow and tedious, because only a single bead could be treated at a time and also considerable time was lost in removing the strips of gum from between the sheets of liner material.

A machine constructed according to the principles of my invention is designed to stitch gum strips to a plurality of tire beads simultaneously. It is also provided with a mechanism adapted to supply continuous strips of gum to the machine, thereby obviating the necessity of removing the strips from between the leaves of the conventional books.

For a better understanding of my invention reference may be had to the accompanying drawings forming a part of this specification, of which:

Fig. 4 is a fragmentary cross-sectional view, on a larger scale, showing the gum strip guiding and cutting mechanism;

Fig. 5 is a cross-sectional view taken substantially along the line V—V of Fig. 3, showing the mechanism employed for cutting a wide strip of gum into a plurality of narrow strips;

Fig. 6 is a fragmentary plan view illustrating the bead rollers and the guide mechanism; and Fig. 7 is a cross-sectional view taken substantially along the line VII—VII of Fig. 6 showing in detail the guide plate actuating screws.

Figure 1:
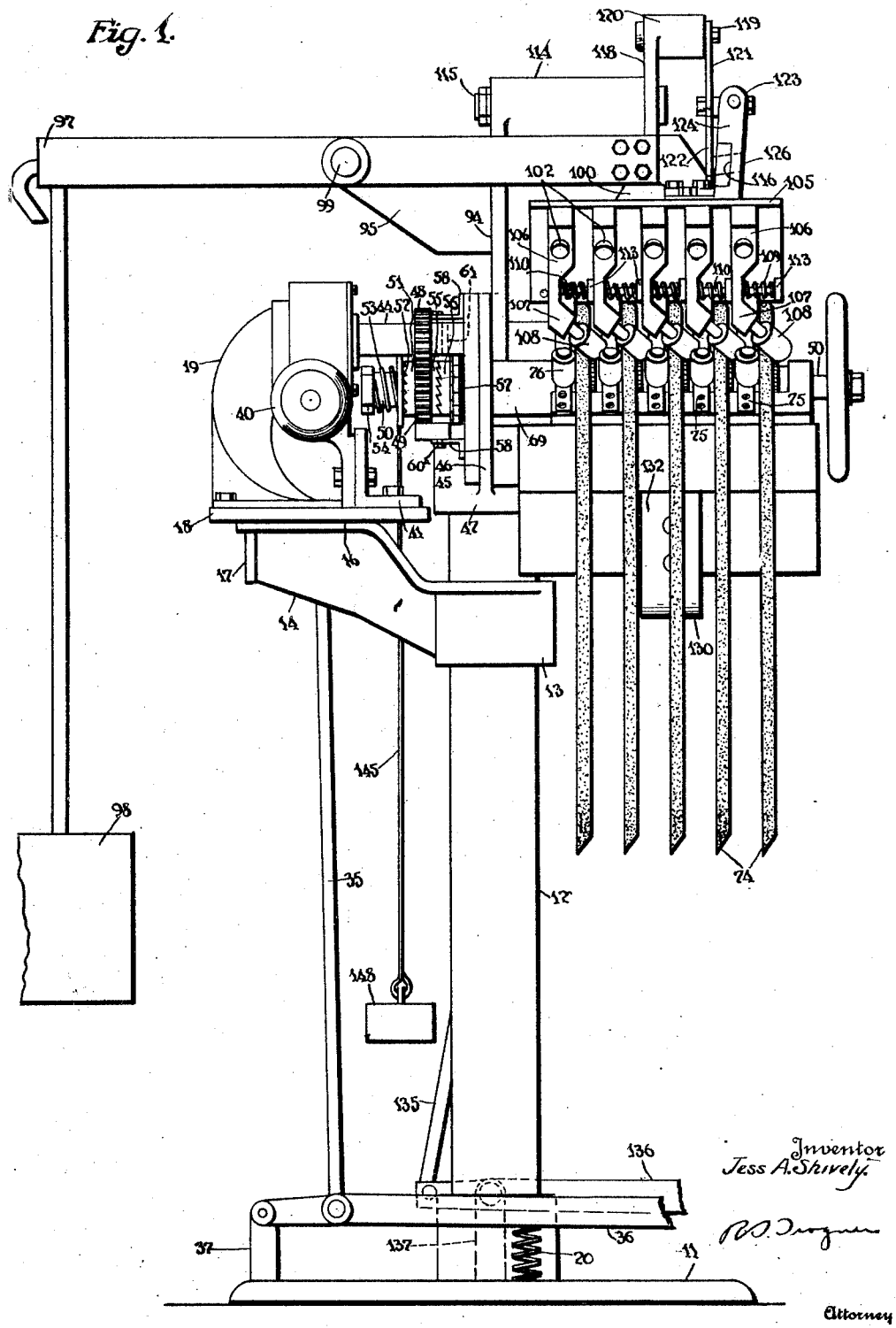
Fig. 1 is a side-elevational view of a gum stripping machine constructed according to my invention.

In practising my invention, I provide a base 11 which serves as a support for a column 12 that has secured thereto a collar 13 having a projecting bracket 14. Reinforcing horizontal and vertical flanges 16 and 17 provide means for supporting a table or platform 18 upon which is mounted a motor 19. A conventional axial shaft 24 of the motor is provided with a clutch 25 composed of complementary discs 26 and 27, the former of which has an annular groove 28 formed therein, in which one end of an arm 29 of an operating bell crank lever 32 is adapted to ride. The lever 32 is pivoted at its apex to a bracket 33 upon the table 18 and a projecting arm 34 thereof is pivotally attached to a connecting rod 35 that extends downwardly and is attached to a treadle 36 pivoted to an upwardly projecting bracket 37 upon the base 12. A spring 20 disposed between the treadle 36 and the base 11 maintains the treadle in its normal position.

The clutch member 27 is co-axially mounted upon a shaft 38 that drives a speed reducing mechanism 40 attached to an angle member 41 supported upon the plate 18. A driven shaft 44 extending from the gear reducing mechanism is journalled in a plate 45 which is secured to an upright arm 46 upon a collar 47 that is secured to the column 12. The shaft is provided with a gear 48 meshing with a gear 49 rotatably mounted upon a stud shaft 50 extending forwardly through the plate 45. The gear 49 is provided with a rear clutch portion 51 meshing with a corresponding movable clutch member 52, splined to the shaft 50 and resiliently urged into contact with the clutch portion 51 by means of a spring 53 that is held upon the shaft by means of a nut 54. The forward side of the gear 49 is provided with a second clutch portion 55 that intermeshes with a complementary movable clutch portion 56 upon a sprocket gear 57 splined to the shaft 50. Angular brackets 58 are bolted to the upright plate 45 on opposite sides of the shaft 50 and a pair of arms 59 of a bifurcated clutch operating lever 60 are pivoted, as indicated at 60ª, to the brackets 58. Pins 61 secured to the arms of the clutch lever project into engagement with the clutch portion 56 and serve to reciprocate the latter upon the shaft 50.

The free end of the clutch lever 60 is pivoted to one end portion of a horizontal rod 62 that projects through the plate 45 and is slidably mounted in brackets 63 secured to the lower side of a projecting channel bar 64 (see Fig. 4) bolted to the plate 45. The lower end of a lever 65 pivoted intermediate its ends to the rear side of the plate 45, as indicated at 65ª, is resiliently urged, by means of springs 67, into engagement with the rod 62, and is adapted to snap into a notch 66 formed therein. The springs 67 are attached at their ends to the lever 65 and to the plate 45, and a coiled spring 68 disposed about the rod 62 urges the latter toward its rearward position.

The shaft 50 extends through the plate 45 and is journalled in end portions 69 and 70 of a bracket 71 of U-shape that is bolted to the forward side of the plate 45 and is provided with bead driving rollers 72 having teeth 73 that engage the beads 74. A series of arms 75 bolted upon the mid portion of the U-shaped member 71, are provided with spaced stitching rollers 76 and 77 that engage the vertical sides of the beads.

A shaft 78 secured to the plate 45 is disposed parallel to the shaft 50 and supports a series of parallel spaced arms 79 journalled thereon. These arms are resiliently urged in an upward direction by means of coil springs 80 mounted upon bolts 81 pivoted to the arms and projecting downwardly through openings in an angular bracket 82 bolted to the collar 13. The free ends of the arms are provided with horizontal rollers 83 which have a limited swinging movement in a vertical plane in openings 84 formed in a series of spaced plates 85. The latter plates are secured to a horizontal shaft 86 that has a bracket portion 87 slidably mounted in the channel member 64 and may be adjusted longitudinally therein by means of an adjusting screw 89 screw-threaded into an end plate 90 mounted upon the channel member.

An upwardly extending bracket 94 (Fig. 1) is secured to the plate 45 and is provided upon its rear side with a projecting arm 95. An arm 97 of U-shape, having a counterweight 98 suspended from the rear end thereof, is journalled intermediate its length upon the arm 95 by means of a bearing pin 99.

The forward end portions 96 of the arm 97 have attached thereto angle members 100, to which is bolted a cross bar 101. One end of the bar 101 has a member 103 of V-shape bolted thereto, to which is secured a stitcher arm supporting plate 105. A plurality of downwardly projecting stitcher arms 106 pivoted, as indicated at 102, to the latter have angularly disposed portions 107 to which are secured stitcher rollers 108 that are positioned, when lowered, between the rows of rollers 76 and 77. The arms 106 are resiliently held in spaced relation with respect to each other by means of coil springs 109 which surround a rod 110 and are confined under compression between the respective arms 106 and plates 113 that are rigidly secured to the plate 105. The rod 110 is held rigidly by the plates 113, but is loosely disposed through the arms 106.

Figure 3:
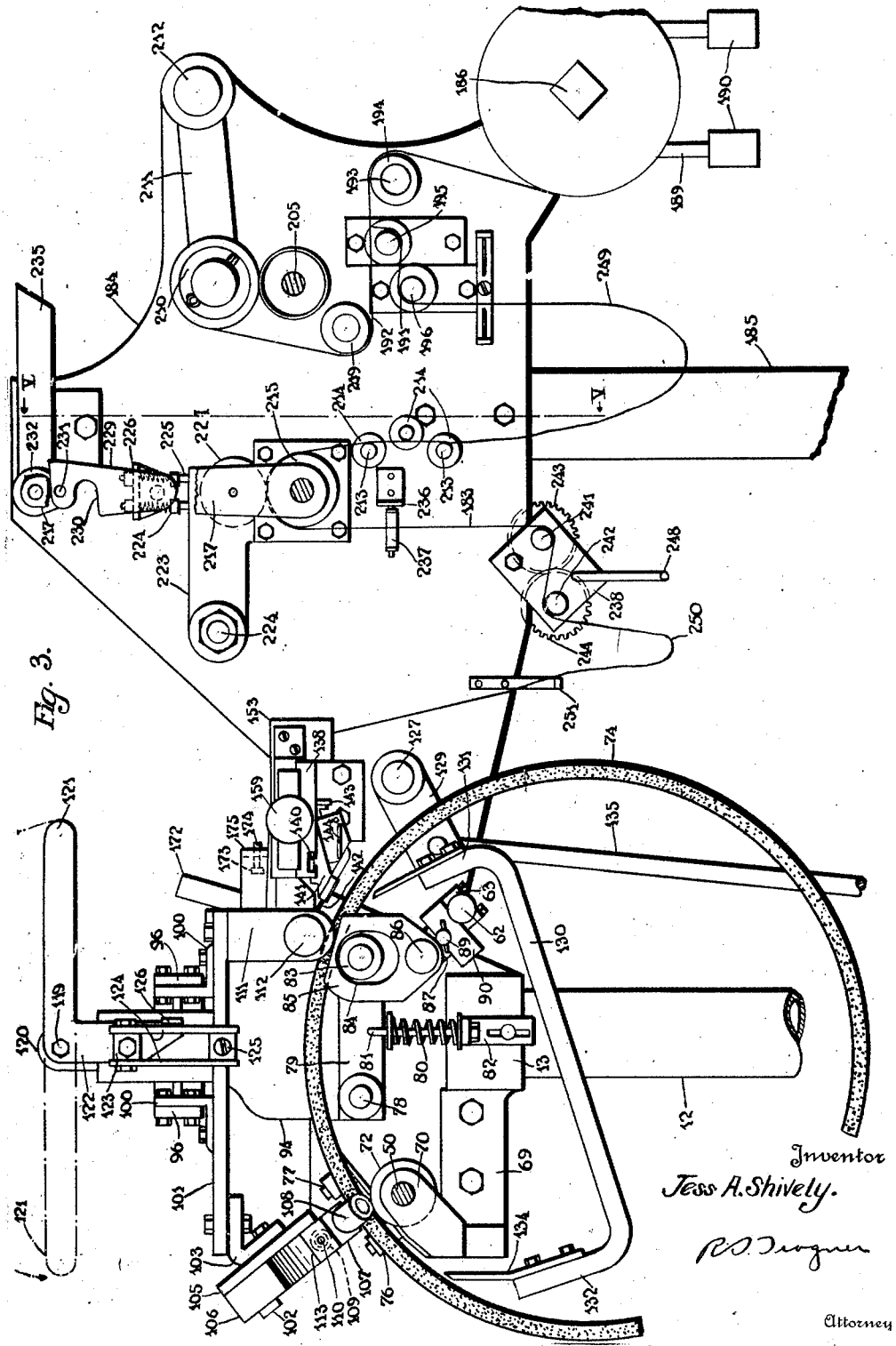
Fig. 3 is a front elevational view illustrating the stitching mechanism and the gum strip supplying mechanism.

The opposite end of the horizontal arm 101 is provided with a bracket 111 of inverted U-shape (Figs. 3 and 4) whose lower ends form journals for a horizontal roller 112 that is adapted to coact with the rollers 83.

As best shown by Fig. 1, a forwardly projecting portion 114 of the bracket 94 is bored to receive a bolt 115 extending therethrough and securing an upwardly extending member 118 in a vertical position. The latter member is provided with a bolt 119 extending through a horizontal portion 120 thereof, to which is pivoted the apex of a bell crank lever 121. A universal connection 123 attached intermediately of the arm 122 pivotally supports the upper ends of a pair of links 124, the lower ends of which are provided with a universally pivotal connection 125 to the horizontally disposed bar 101. One of the links 124 is notched, as indicated at 116. The end of the arm 122 of the bell crank lever projects downwardly below the connection 123 and is provided with an angularly disposed lug 126 which engages the links 124 and thereby serves as a stop to limit the movement of the links. The lever 121 is rotatable approximately 180 degrees in a counter-clockwise direction, as viewed in Fig. 3, to the position indicated by dot and dash lines. In this position the head of the bolt 119 is disposed between the links 124 and serves as a stop against one of them. The notch 116 permits the head of the bolt 119 to assume the position described.

A bead lifter comprising a shaft 127 is secured to the frame plate 45 and has journalled thereon a bead lifting arm 129 having a portion 130 of U-shape, to the branches 131 and 132 of which are bolted upwardly projecting plates 133 and 134, whose edges are disposed slightly below the rollers 72 and 83. A link 135 pivotally attached to the arm 129 is pivoted at its lower end to one end of a treadle 136 that is pivoted intermediately to a bracket 137 upon the base 11.

A horizontally disposed plate 138 (see Fig. 4) bolted to the plate 45 is provided upon its lower side with a guide groove 139 in which an angular portion 140 of a knife carriage 141 is slidably mounted. The edge portion of the knife carriage adjacent the roller 112 rotatably supports a cutting disc 142 whose edge engages the roller 112 and the opposite edge of the knife carriage is guided by a roller 143 secured thereto, that engages the lower surface of the horizontal arm 138. A handle 144 is secured to the forward end of the carriage and a retracting cable 145 (see Fig. 6) secured to the rear thereof is trained over a roller 146 supported by a bracket 147 bolted to the plate 45 and has a weight 148 attached to its lower end.

Figure 2:
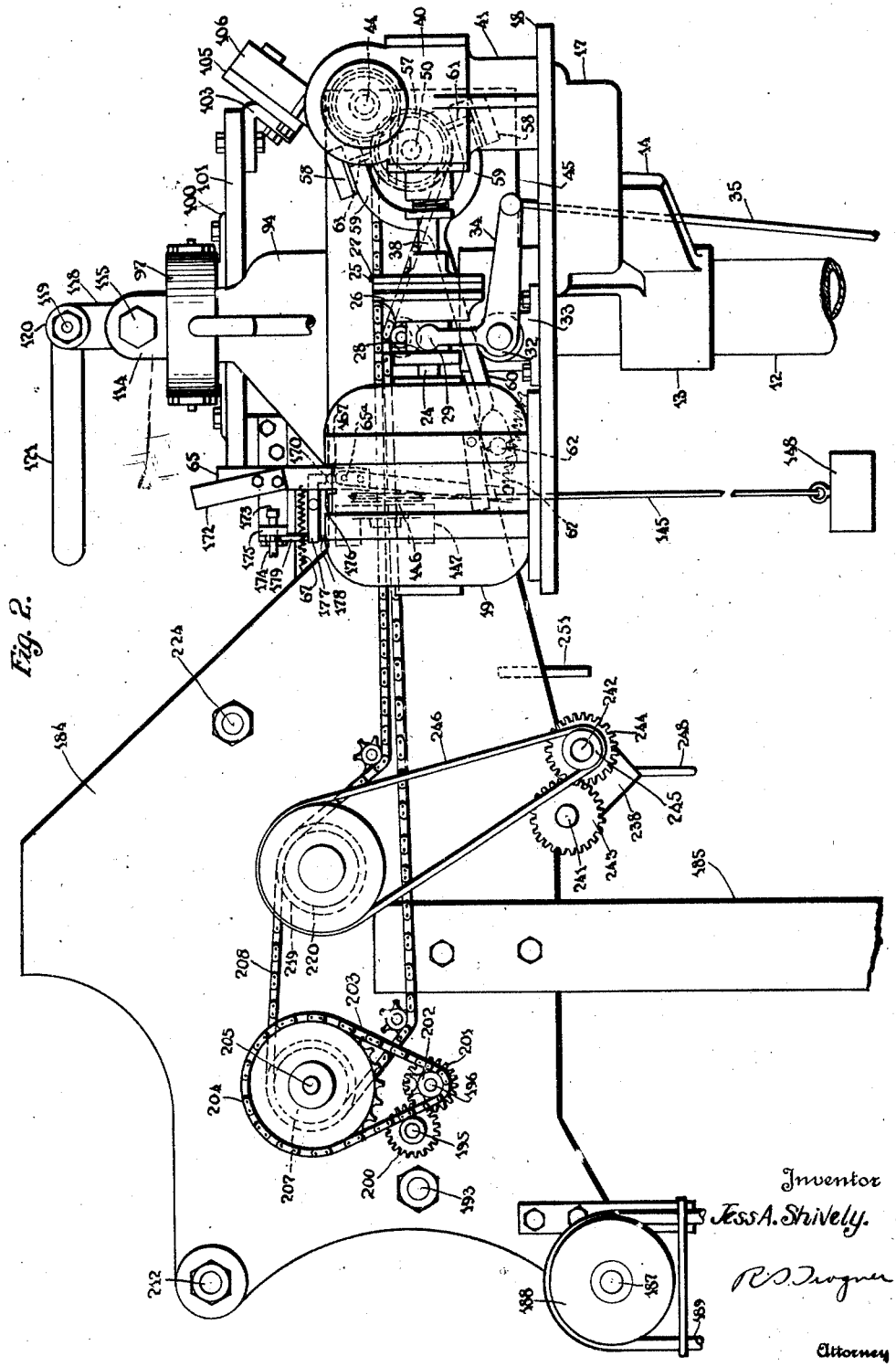
Fig. 2 is a fragmentary rear-elevational view particularly illustrating the mechanism for driving the various rollers of the gum stripping machine.

The upper face of the projecting plate 138 is grooved, as indicated at 150, for slidably receiving guide plate supporting members 151 and 152 (see Fig. 6) that support a series of parallel spaced guide plates 153 attached thereto by means of angularly disposed lugs 154 formed integrally thereon. Each alternate plate is secured to the member 151, while the remaining plates are secured to the member 152. The two sets of plates thus formed may be moved simultaneously in opposite directions by means of lugs 155 and 156 secured respectively to members 151 and 152. The lugs 155 and 156 engage oppositely directed threads 157 and 158 of a screw 159 having a circumferentially channeled collar 160 disposed between the lugs. A disc 161 (see Fig. 7) engaging the channeled portion of the collar 160 is secured to one end of a screw 162 that is threaded into the end of the horizontal member 138. Small arms 163, having end portions pivoted, as indicated at 163ª, to the support 138 between the pairs of guide plates, are formed with angularly disposed portions 164 opposite their pivotal connections, upon which are journalled small gum strip engaging rollers 165 that are adapted to rest upon a laterally movable roller 167 having an enlarged portion 168 adjacent the plate 45 which contacts with the roller 112. One end of the roller 167 has a stationary bearing in a cross member 169 (Fig. 6) secured to the upper face of the plate 138 and has a slight degree of pivotal movement therein. The other end is journalled, as indicated at 170 (Fig. 2), in the upper portion of the swinging lever 65 which has an upwardly inclined portion 172 disposed in the path of an operating cam 173. The latter is attached to the end of a set screw 174 screw-threaded in the end of a bracket 175 of L-shape which is attached to the roller support 111.

A rearwardly projecting bolt 176 (Fig. 6) formed upon the knife carriage 141 extends through a notch or opening in the plate 45 and engages the lever 65, thereby maintaining the latter together with the roller 167 in contact with the roller 112 against the retractive force of the springs 67. A brake lever 177 pivoted to the support 138 is urged, by a spring 178 secured between it and the upper edge of the plate 45, into contact with the roller 167. The end of the lever 178 is lifted from contact with the roller 167 when the latter is in contact with the roller 112, by engagement of the other end with a downwardly projecting lug 179 secured to the arm 175. A pair of rollers 180 and 181 (Fig. 4) mounted in the bar 169 and a corresponding bar 182 adjacent the opposite end of the plate 138 non-frictionally support relatively narrow strips of gum 183 that are directed between the guide plates 153.

A suitable gum strip supply mechanism is mounted upon an enlarged rearwardly projecting portion 184 of the plate 45 that is supported by a column 185. A gum strip supply roller 186 is journalled in the rear end of the plate 184 and is provided with a projecting end 187 to which it attached a pulley 188 which has a brake band 189, provided with actuating weights 190, trained thereabout.

A gum strip 191 and a liner 192 wound upon the shaft 86 are trained about a horizontal shaft 193 supported by the frame 184 and having mounted thereon a rotatable idler sleeve 194. Separator shafts 195 and 196, positioned adjacent the shaft 195, and whose rear ends project through the plate 184, are provided with inter-meshing gears 200 and 201. A sprocket gear 202, keyed to the shaft 196, has a sprocket chain 203 trained thereabout that encircles a sprocket 204 secured to a shaft 205. The latter is also provided with a sprocket gear 207 which is driven by a sprocket chain 208 trained about the sprocket gear 57. The shaft 205 projects forwardly through the plate 184 adjacent and in parallel relationship to a second idler roller 209 about which the liner 192 is trained, and contacts with a liner-rewinding roller 210 mounted upon a swinging arm 211 having pivotal connection 212 to the plate 184. Three gum strip guiding rollers 213 having guiding collars 214 rigidly secured thereon are journalled in the plate in staggered relation slightly in advance of the rollers 195 and 196.

A roller 215 having a hand wheel 216 (Fig. 5) secured adjacent one end thereof, is journalled in the plate 184 and in a vertically disposed arm 217 mounted upon a shaft 218. Journal bearings 233, formed in a bracket 234 projecting forwardly from the plate 184, rotatably support the shaft 218. A sprocket gear 219, driven by the sprocket chain 208, is rotatably mounted on the end portion of the roller 215. The sprocket 219 and a clutch portion 220, splined upon the end portion of the roller 215, have intermeshing one-way clutch teeth 220ª, which yieldably engage each other by means of a spring 221ª normally under compression and confined between the clutch portion 220 and a pulley 247 rigidly mounted upon the end of the roller 215. Discs 221, having cutting edges, normally engage the roller 215, and are journalled in bifurcated portions 222 of arms 223 that are pivoted upon a shaft 224 projecting rigidly from the plate 184. The cutting discs 221 are held yieldably against the roller 215 by means of springs 227 coiled about bolts 225 that are secured to the respective arms 223 and extend upwardly through a bar 226 of U-shape. The latter is supported by links 229, one of which is notched as indicated at 230, and both of which have pivotal connections 231 to crank lugs 232, that are rigidly mounted upon the shaft 218. The shaft is also provided with an operating handle 235 whereby it may be rotated through an angle of 180 degrees to raise or lower the links. In its raised position the notched portion 230 of the arm 229 engages the shaft 218.

A gum strip separating device comprising an arm 236 having parallel spaced rollers 237 mounted thereon is secured to the plate 184 below the roller 215. A bracket 238 attached to the plate 184 rotatably supports a pair of gum strip feed rollers 241 and 242 that extend therethrough and are provided upon their rear ends with intermeshing gears 243 and 244. The shaft 241 is provided upon its rear extremity with a pulley 245 that is driven by a band 246 trained about it and the pulley 247 of larger diameter above referred to. A guard arm 248 is attached to the plate 238 and extends downwardly between loops of gum 249 and 250 formed respectively between rollers 215 and 196 and in advance of the roller 242. A second guard arm 251 attached to the lower edge of a plate 184 extends downwardly between the loop 250 and the beads 74.

In operating my machine, a strip of gum 191 rolled within the convolutions of the liner 192 is placed upon the shaft 186 and the end of the two strips is drawn out over the idler sleeve 194, the gum strip passing beneath the roller 195 and over the roller 196 and the liner strip passing beneath the idler roller 209 and over the take-up roller 210. The gum strip is then passed upwardly between the guide rollers 213. The knives 221 are raised by means of the handle 235 and the end of the strip is positioned between the knives and the roller 215. By lowering the knives 221 against the roller 215 and by rotating the hand wheel 216, the strip is split into a plurality of relatively narrow strips 183 that are directed between the separating rollers 237, thus properly spacing the strips. The spaced strips are passed beneath the roller 241 and over the roller 242 and are then led upwardly and drawn between the guide plates 153. The levers 163 are raised over the rollers 181 and 180, so that the strips may be drawn forward over the roller 167.

To gum strip the beads 74 the lever 121 is operated to raise the bar 101 and consequently so to lift the stitcher rollers 108 and the roller 112 as to permit the beads to be spaced between the stitcher rollers 76. By rotating the screw 159 the guide plate carrying members 150 are actuated in opposite directions, thereby so adjusting the guide plates 153 as to vary the distance therebetween. The plates may also be correctly centered with respect to the tips of the beads 74 by rotating the screw 162, thereby causing the guide plates to move backward or forward as a unit upon the supporting arm 138. After the guides have been properly centered with respect to the beads the gum strips are led forward and the tips thereof are positioned by manually pressing them against the tips of the beads, thereby causing them to adhere to the latter.

The arms 163 are then lowered, thus causing the rollers 165 to engage and press downwardly upon the gum strips. The handle 121 is also operated to lower the roller 112 and the stitcher rollers 108 into contact with the beads. The treadle 36 is operated to throw the clutch members 26 and 27 into engagement with each other, thus causing the shaft 50 to rotate and impart a corresponding rotation to the beads through the action of the rollers 72 upon the inner peripheries of the latter.

During the stitching operation, the enlarged portion 168 upon the roller 167 contacts with and is driven by the roller 112 which is driven by contact with the rotating beads 74. Owing to the difference in diameter between the enlarged portion 168 and the remainder of the roller 167 the periphery of the latter travels at a slightly lower rate of speed than the periphery of the enlarged portion and of the roller 112. There is, therefore, a tension placed along the longitudinal axis of the gum strip which is clamped between the tip or corner of the bead and the roller 112. This tensioning of the central portion of the strip causes the edges thereof to curl downwardly in conformation to the side faces of the beads so that the edges may be readily stitched to the latter when they pass between the stitcher rollers 76, 77 and 108.

The gum unwinding mechanism and the cutting mechanism are driven at approximately the same speed as the beads through the action of the sprocket chain 208 upon the sprocket gears 207 and 219. When a sufficient amount of gum has been applied to the bead, the knife carriage 141 is drawn forwardly by the handle 144, thus causing the gum strips to be severed by the pressure of the cutting discs 142 upon the rollers 112.

It is desirable that the beads be so rotated a short distance independently of the feeding mechanism that the end of the freshly severed piece of gum may be stitched to the bead without more gum being fed forwardly. This is accomplished by pulling the rod 62 forwardly, thereby releasing the clutch portions 55 and 56 upon the gears 49 and 57 respectively. The rod is held in this position by engagement of the notch 66 with the lower end of the lever 65, which at this time is released from engagement with the bolt 176 as the knife carriage 141 is actuated. The springs 67 actuate the lever 65 into engagement with the notch 66 as soon as it is released. The movement of the lever also swings the roller 167 out of engagement with the roller 112 and thereby arrests the forward movement of the gum strips. When the carriage 141 is released it is retracted by the force of the weight 148, but the lever 65 has been actuated to such position that the end of the bolt 176 bears against the side face thereof.

When the bell crank lever 121 is operated to raise the rollers 108 and 112 from engagement with the beads 74, the cam 173 is carried upwardly by the bracket 175 and engages the portion 172 of the lever 65, thereby releasing the latter from engagement with the notch 66 in the rod 62. This movement permits the clutch portions 55 and 56 again to become engaged and consequently to rotate the gum feeding mechanism. The bolt 176 on the knife carriage 141 is also projected rearwardly as soon as the lever 65 is pivoted beyond the path of movement thereof and the lever is thereby locked until the carriage 141 is again drawn forwardly.

While the rollers 108 and 112 are in elevated position the brake lever 178 engages the roller 167 and so prevents the tensioned gum strips 183 from being retracted from between the rollers 165 and 167.

The pedal 36 is again operated to throw the clutch portions 26 and 27 into engagement, thus rotating the beads independently of the gum strip supply mechanism and stitching down the end portions of the severed gum strips. The lever 121 is then operated to raise the stitcher rollers 108 and the roller 112 from engagement with the beads, and the latter are so lifted by means of the pedal 136 that operates the bead lifting arm 129, that they may be readily removed from the machine.

From the foregoing description it will be apparent that I have provided a gum stripping machine in which a plurality of beads may be gum stripped simultaneously. I have also provided mechanism for feeding continuous strips of gum to the gum stripping mechanism, thereby obviating the necessity of removing the strips manually from books of liner material.

Although I have illustrated but one form which my invention may assume and described in detail but a single application thereof, it will be apparent to those skilled in the art that the invention is not so limited but that various minor modifications may be made therein without departing from the spirit of the invention or from the scope of the appended claims.

What I claim is:

1. A method of applying gum strips to tire beads that comprises providing a continuous relatively wide strip of gum, splitting the gum into a number of narrow strips, stitching a plurality of strips simultaneously to the tips of a plurality of beads, and severing the material stitched to the beads from the remainder of the strips.

2. A machine for applying gum strips to tire beads comprising means for supporting a bead, means for stitching a gum strip to the bead, a supply roller adapted to support a roll of gum, and means driven by the stitching means to draw the gum from the supply roller at substantially the same rate that it is stitched to the beads.

3. A machine for applying gum strips of tire beads comprising means for supporting and rotating a tire bead, means for stitching a gum strip to the tire bead, a gum strip supply roller adapted to support a roll of gum and a roller engaging the stitching means and having portions driven at a lower rate of speed than the stitcher roller for supplying a strip of gum to the stitching means under tension.

4. A machine for simultaneously applying gum strips to a plurality of beads comprising supporting rollers secured to a driven shaft, means for supplying gum strips to the beads, stitching rollers, and means supporting the rollers for moving them into contact with the beads to stitch the gum strips into position thereon.

5. A machine for applying gum strips to tire beads comprising mechanism for supporting and rotating a tire bead, a motor geared thereto, a gum strip supply roller associated with the bead supporting mechanism, unwinding mechanism connected to and driven by the motor and adapted to withdraw gum from the supply roller and deliver it to the tire beads, a clutch mechanism associated with the motor for actuating the unwinding mechanism and the bead rotating mechanism simultaneously, and a second clutch mechanism associated with the unwinding mechanism whereby to stop the latter independently of the bead rotating mechanism.

6. A machine for applying gum strips to tire beads comprising mechanism adapted to support and simultaneously rotate a plurality of tire beads, stitching mechanism associated therewith for stitching gum strips to the beads, gum strip guides associated with the stitching mechanism, a gum strip stretching mechanism associated with the guide mechanism for supplying the strips to the stitching mechanism under tension and means for supplying continuous strips of gum to the guide mechanism.

7. A machine for applying gum strips to tire beads comprising means for simultaneously supporting and rotating a plurality of tire beads, mechanism for simultaneously stitching gum strips to the tire beads, feed rollers positioned adjacent the bead supporting mechanism, means for driving the feed rollers simultaneously with the bead rotating mechanism, a supply roller associated with the feed rollers for supporting a roll of relatively wide gum strip and means positioned between the feed rollers and the supply roller for splitting the gum strip into a plurality of relatively narrow strips.

8. A machine for applying gum strips to tire beads comprising means for supporting and rotating a plurality of tire beads simultaneously, stitching mechanism mounted adjacent thereto and provided with means to move it into and out of contact with the tire beads upon the supporting mechanism, gum strip guides positioned adjacent to the bead supporting mechanism, rollers associated with the guide mechanism and provided with means for tensioning the gum strips, gum strip feed mechanism associated with the guide mechanism, cutting mechanism associated with the feed mechanism for splitting a relatively wide band of gum material into narrow strips, and means associated with the last mentioned mechanism to supply the wide band of gum material thereto.

9. A gum strip applying machine comprising bead rotating rollers, stitcher rollers associated therewith, gum strip guides positioned to deliver gum to beads upon the rollers, a reciprocating gum strip cutting knife positioned between the guides and the bead rotating rollers and gum strip feeding rollers associated with the guides.

10. In a gum strip applying machine, a driven roller, a plurality of knives yieldably mounted for slight independent movement with respect to each other, and means to move the knives simultaneously into and out of contact with the driven roller.

11. In a gum strip applying machine, a driven roller, a plurality of knives yieldably mounted for slight independent movement with respect to each other, means to move the knives simultaneously into and out of contact with the driven roller, and means for stitching the strips of gum to the tips of tire beads.

12. A gum strip applying machine comprising a driven shaft, two sets of stitcher rollers positioned approximately vertically with respect thereto, a movable member, inclined stitcher rollers secured to the movable member and movable to a position in which each inclined roller is positioned between two vertical rollers.

13. A gum strip applying machine comprising a driven shaft, two sets of stitcher rollers positioned approximately vertically with respect thereto, a movable member, inclined stitcher rollers secured to the movable member and movable to a position in which each inclined roller is positioned between two vertical rollers and means to lift the beads simultaneously from between the vertical rollers.

14. A gum strip applying machine comprising a driven shaft, two sets of stitcher rollers positioned approximately vertically with respect thereto, a movable member, inclined stitcher rollers secured to the movable member and movable to a position in which each inclined roller is positioned between two vertical rollers, means to lift the beads simultaneously from between the vertical rollers, and means to supply simultaneously a plurality of gum strips to beads between the vertical rollers.

15. A gum strip applying machine comprising means to support and rotate a plurality of tire beads, means to supply a broad strip of gum, means for dividing the gum into narrow strips, means for stitching the narrow strip simultaneously to the beads, and means for severing the strips.

16. A gum strip applying machine comprising means to support and rotate a plurality of tire beads, means to supply a broad strip of gum, means for splitting the gum into narrow strips, means for spacing the strips, means for stitching the strips simultaneously to the beads, and means for severing the strips.

17. A machine for applying strips of gum to tire beads comprising means for simultaneously supporting and rotating a plurality of beads, guides for maintaining the beads in position upon the supporting means, and means for simultaneously adjusting the position of the guides in a direction parallel to the central axes of the beads.

18. A machine for applying strips of gum to tire beads comprising means for simultaneously supporting and rotating a plurality of beads, guides for maintaining the beads in position upon the supporting means, means for simultaneously adjusting the position of the guides in a direction parallel to the central axes of the beads, and means for supplying and stitching strips of gum simultaneously to the beads.

19. A machine for applying strips of gum to tire beads comprising means for simultaneously supporting and rotating a plurality of beads, guides for maintaining the beads in position upon the supporting means, means for simultaneously adjusting the position of the guides in a direction parallel to the central axes of the beads, means for supplying and stitching strips of gum simultaneously to the beads, a second set of guides for directing the strips into alignment with the tips of the beads, the guides being adjustable in width to accommodate different widths of gum strip.

Signed at Akron, in the county of Summit, and State of Ohio, this 12th day of November, 1927.

JESS A. SHIVELY.